UNITED STATES PATENT OFFICE.

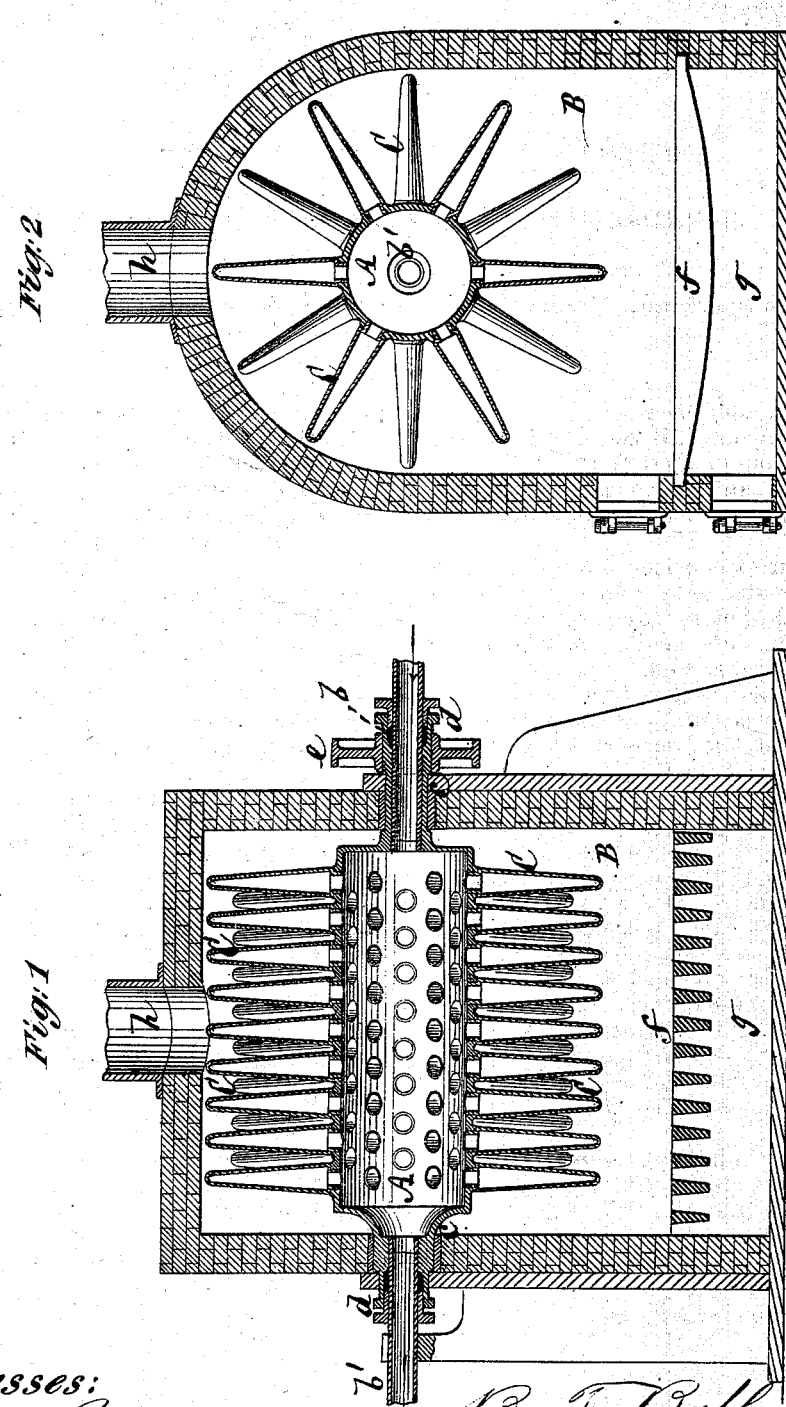

BENJAMIN T. BABBITT, OF NEW YORK, N. Y.

IMPROVEMENT IN REVOLVING STEAM-BOILERS.

Specification forming part of Letters Patent No. 146,634, dated January 20, 1874; application filed June 25, 1873.

*To all whom it may concern:*

Be it known that I, BENJAMIN T. BABBITT, of the city, county, and State of New York, have invented an Improvement in Revolving Steam-Boilers, of which the following is a specification:

This invention consists in a revolving tubular body provided with hollow trunnions, and studded with hollow tapering radial tubes, closed at their outer ends, but in communication, at their inner ends, with said body, the whole being arranged within or over a suitable fire place or grate, and so that water introduced through the one trunnion of the tubular body is rapidly converted into steam by or as it enters the tapering radial tubes in their lower range of motion, and the steam thus produced passed off through the opposite trunnion of the tubular body, the whole forming a very efficient steam-generator, capable of producing steam in flashes or from small supplies of water with perfect safety, and with every convenience as regards construction and repairs of the boiler when necessary.

In the accompanying drawings, Figures 1 and 2 represent sectional elevations, in planes at right angles to each other, of a revolving steam-boiler constructed in accordance with my invention.

A is a horizontally-arranged tubular body or cylinder, provided with hollow trunnions $b$ $b'$, which rest and turn in bearings $c$ $c$ of a chamber or case, B, and pass through stuffing-boxes $d$, also the one of which carries a gearing or pulley, $e$, for rotating the boiler. Said case or chamber B contains the grate $f$, ash-pit $g$, and draft-outlet or chimney $h$ for the gaseous products of combustion. The hollow tubular body A is studded, preferably in an irregular manner, or out of line with each other as regards each longitudinal row or line, with hollow tapering radial tubes C, closed at their outer ends, but in communication at their inner ends with said body A.

The water is introduced by a small stream or in jets through the hollow trunnion $b$, and is rapidly converted into steam by or as it enters the tapering radial tubes C in their lower range of motion, and the steam thus produced passed off along the opposite trunnion $b'$, the tapering shape of the radial tubes providing for the quick escape of the steam, and facilitating clearance of sediment or deposit as their vertical position is reversed. The construction, too, by the separate insertion of the tubes C, facilitates transportation, and affords much convenience as regards putting together or taking apart, and substitution, when required, of the details of the boiler, and the structure generally combines safety with economy and efficiency, together with freedom for independent expansion and contraction of the parts.

What is here claimed, and desired to be secured by Letters Patent, is—

The revolving tubular body A, studded with hollow tapering radial tubes C, and provided with hollow trunnions or bearings $b$ $b$, substantially as specified.

BENJ. T. BABBITT.

Witnesses:
MICHAEL RYAN,
FRED. HAYNES.